United States Patent
Moradi-Araghi et al.

(10) Patent No.: US 6,387,986 B1
(45) Date of Patent: May 14, 2002

(54) COMPOSITIONS AND PROCESSES FOR OIL FIELD APPLICATIONS

(76) Inventors: Ahmad Moradi-Araghi, 1931 Windstone Dr., Bartlesville, OK (US) 74006; Kari Daasvatn, Mellbyedalen 9b, N-0287 Oslo; Aly A. Hamouda, Mjughaug Kroken 10, 4048 Hafrsfjord, both of (NO)

( * ) Notice: Subject to any disclaimer, the term of this patent is extended or adjusted under 35 U.S.C. 154(b) by 0 days.

(21) Appl. No.: 09/338,955

(22) Filed: Jun. 24, 1999

(51) Int. Cl.$^7$ .............................. C08K 9/10; C09K 7/00; E21B 43/16
(52) U.S. Cl. ..................... 523/211; 523/130; 523/131; 523/132; 523/210; 166/300; 166/308
(58) Field of Search ................................. 523/130, 131, 523/132, 210, 211; 166/300, 308

(56) References Cited

U.S. PATENT DOCUMENTS

| | | | | |
|---|---|---|---|---|
| 3,958,638 A | * | 5/1976 | Johnston | |
| 4,624,795 A | | 11/1986 | Dawson et al. | 252/8.553 |
| 4,665,986 A | * | 5/1987 | Sandiford | |
| 4,978,483 A | * | 12/1990 | Redding, Jr. | |
| 5,407,609 A | * | 4/1995 | Tice et al. | |
| 5,437,331 A | | 8/1995 | Gupta et al. | 166/300 |
| 5,445,223 A | * | 8/1995 | Nelson et al. | |
| 5,843,251 A | * | 12/1998 | Tsukagoshi et al. | |
| 5,981,447 A | * | 11/1999 | Chang et al. | |
| 6,051,690 A | * | 4/2000 | Ahmed et al. | |

FOREIGN PATENT DOCUMENTS

JP        3220-246        *   9/1991

* cited by examiner

*Primary Examiner*—Tae H. Yoon
(74) *Attorney, Agent, or Firm*—Gary L. Haag

(57) ABSTRACT

Encapsulated crosslinking agents and gel-forming compositions are provided that can be utilized in oil field applications. Processes for producing said encapsulated crosslinking agents and said gel-forming compositions are also provided. In addition, a process for injecting said gel-forming composition into a subterranean formation is also provided.

22 Claims, No Drawings

COMPOSITIONS AND PROCESSES FOR OIL FIELD APPLICATIONS

FIELD OF INVENTION

This invention relates to compositions and processes for oil field applications. More specifically, this invention relates to encapsulated crosslinking agents, gel-forming compositions, and processes for producing and using encapsulated crosslinking agents and gel-forming compositions.

BACKGROUND OF THE INVENTION

It is well known to those skilled in the art that certain polymers are useful in enhanced oil recovery and other oil field operations. These polymers have been used to alter the permeability of subterranean formations. For example, these polymers can be used to enhance the efficiency of water flooding, or carbon dioxide injection in enhanced oil recovery processes, to plug fractures or channels, to prevent loss of drilling fluids, and to block gas release during drilling.

Generally, these polymers are combined with a gelling agent in a liquid to form a gel-forming composition. These gel-forming compositions can be injected into a subterranean formation. These gel-forming compositions then gel in the regions of the subterranean formation that have the highest water permeability.

However, many of these polymers can gel within minutes, which makes the application of said gel-forming compositions less useful in many oil field applications. This is because these gel-forming compositions cannot be properly placed in a subterranean formation, prior to it forming a gel.

Various methods have been tried to slow down gel formation, however, slower gel formation is needed because this will allow placement of gel-forming compositions in subterranean formations prior to forming a gel, especially in hostile environments.

Therefore, there is a need in the oil industry for a gel-forming composition with a slower gel formation rate (also known as "gelation rate").

SUMMARY OF THE INVENTION

It is an object of this invention to provide a process for producing an encapsulated crosslinking agent.

It is another object of this invention to provide an encapsulated crosslinking agent.

It is another object of this invention to provide a process for producing a gel-forming composition, said process comprising mixing an encapsulated crosslinking agent, a second polymer, and a ligand.

It is still another object of this invention to provide a gel-forming composition.

It is yet another object of this invention to provide a process for injecting a gel-forming composition into a subterranean formation.

In one embodiment of this invention, a process is provided for producing an encapsulated crosslinking agent comprising (or optionally, "consisting essentially of", or "consisting of") encapsulating a crosslinking agent with a first polymer.

In another embodiment of this invention, an encapsulated crosslinking agent is provided comprising (or optionally, "consisting essentially of" or "consisting of") a first polymer and a crosslinking agent, wherein said crosslinking agent is encapsulated by said first polymer.

In another embodiment of this invention, a process for producing a gel-forming composition is provided, said process comprising (or optionally, "consisting essentially of" or "consisting of") mixing an encapsulated crosslinking agent, a second polymer, and a liquid, wherein said encapsulated crosslinking agent, said second polymer, and said liquid are each present in said gel-forming composition in an amount effective to form a gel.

In yet another embodiment of this invention, a gel-forming composition is provided comprising (or optionally, "consisting essentially of" or "consisting of") an encapsulated crosslinking agent, a second polymer, and a liquid wherein said encapsulated crosslinking agent, said second polymer, and liquid are each present in said gel-forming composition in an amount effective to form a gel.

In still another embodiment of this invention, a process is provided comprising (or optionally, "consisting essentially of" or "consisting of") injecting a gel-forming composition into a subterranean formation, wherein said gel-forming composition comprises an encapsulated crosslinking agent, a second polymer, and a liquid.

These objects and other objects of this invention will become more apparent with reference to the following.

DETAILED DESCRIPTION OF THE INVENTION

In one embodiment of this invention, a process for producing an encapsulated crosslinking agent is provided, said process comprising encapsulating a crosslinking agent with a first polymer.

Any crosslinking agent that is capable of crosslinking with a second polymer can be used in the process of the present invention. Said second polymer is discussed later in this disclosure. Generally, said crosslinking agent is selected from the group consisting of multivalent metallic compounds and organic crosslinking agents. The presently preferred multivalent metal compound is a metal compound selected from the group consisting of a complexed zirconium compound, a complexed titanium compound, a complexed chromium compound, a complexed aluminum compound, a complexed tin compound, a complexed iron compound, and mixtures thereof. The term "complexed" as used in this disclosure means a compound formed by the union of a metal ion with a nonmetallic ion or molecule called a ligand. Suitable multivalent metallic compounds are selected from the group consisting of zirconium citrate, zirconium tetrachloride, zirconium oxychloride, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis(triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium nitrate, chromium chloride, chromium citrate, chromium acetate, chromium propionate, and combinations of any two or more thereof. The presently most preferred crosslinking agent is selected from the group consisting of chromium chloride, chromium propionate, chromium acetate, zirconium acetylacetonate, zirconium tetrachloride, zirconium oxychloride, zirconium lactate, zirconium citrate, zirconium malonate, tetrakis (triethanolamine)zirconate, zirconium complex of hydroxyethyl glycine, zirconium tartarate, zirconium propionate, titanium acetylacetonate, titanium ethylacetoacetate, titanium citrate, titanium triethanolamine, and combinations of any two or more thereof. These compounds are most preferred since they are readily available and form strong gels.

An organic crosslinking agent can also be utilized in said gel-forming composition. For example, said organic crosslinking agent can be selected from the group consisting of formaldehyde; precursors of formaldehyde, such as, hexamethylenetetramine; furfuryl alcohol; aminobenzoic acid; phenol and phenolic derivatives, such as, hydroquinone, phloroglucinol, catechol, resorcinol, salicylic acid, salicylamide, and vanillin. A more detailed description of organic crosslinking agents can be found in U.S. Pat. Nos. 5,399,269 and 5,480,933, herein incorporated by reference.

Said first polymer can be any polymer that can degrade over a period of time to release said crosslinking agent. Said first polymer selected varies depending on the gelation rate desired. Degradation of said first polymer can occur, for example, by hydrolysis, solvolysis, melting, or other mechanisms. Preferred first polymers are selected from the group consisting of homopolymers and copolymers of glycolate and lactate, polycarbonates, polyanhydrides, polyorthoesters, and polyphosphacenes. Most preferably, said first polymer is poly(lactic acid-co-glycolic acid).

Said crosslinking agent is encapsulated by said first polymer by any method known in the art. For example, said encapsulation can be accomplished by a method selected from the group consisting of a double emulsion technique and a spray drying technique. Generally, said double emulsion technique involves the evaporation of a secondary emulsion by freeze drying or other drying method. For example, to prepare said encapsulated crosslinking agent, a first aqueous solution of said crosslinking agent to be encapsulated is emulsified in a first organic compound containing said first polymer to produce a primary emulsion. Said first organic compound can be any organic compound capable of placing a majority of said first polymer in solution. For example, said first organic compound can be selected from the group consisting of dichloromethane, ethyl acetate, cyclohexane, and mixtures thereof. Most preferably, said first organic compound is selected from the group consisting of dichloromethane and ethyl acetate, since these organic compounds have low boiling points and are not miscible in water. The primary emulsion can be produced by any mixing method known in the art. For example, said primary emulsion can be prepared by using mechanical mixing equipment.

The primary emulsion is then dispersed in a second aqueous solution, and then emulsified to produce said secondary emulsion. Said second aqueous solution includes hydrophilic stabilizers, such as, but not limited to, polyvinyl alcohol and surfactants. Polyvinyl alcohol is most preferred since it forms stable emulsions. The secondary emulsion is then evaporated by freeze drying or other method to remove said first organic compound and said second aqueous solution leaving said encapsulated crosslinking agent.

Spraying drying involves the atomization of a liquid feedstock comprising said first polymer and said crosslinking agent into a spray of droplets. The droplets are typically dried with hot air in a drying chamber. Generally, the spray is produced by rotary or nozzle atomizers.

In another embodiment of this invention, said encapsulated crosslinking agent is provided comprising said first polymer and said crosslinking agent, wherein said crosslinking agent is encapsulated with said first polymer. Said crosslinking agent and said first polymer were previously discussed in this disclosure.

In another embodiment of this invention, a process for producing a gel-forming composition is provided, said process comprising mixing an encapsulated crosslinking agent, a second polymer, and a liquid, wherein said second polymer, said encapsulated crosslinking agent, and said liquid are each present in said gel-forming composition in an amount effective to form a gel.

The gel-forming composition can also comprise a clay which can cause a water- or oil-based fluid to become viscous. Examples of suitable clays include, but are not limited to, kaolinite, halloysite, vermiculite, chlorite, attapulgite, smectite, montmorillonite, illite, saconite, sepiolite, palygorskite, Fuller's earth, and combinations of any two or more thereof. The presently preferred clay is montmorillonite clay. The presently most preferred clay is sodium montmorillonite, which is also known as bentonite, since it is readily available and effective. Based on the total weight of the gel-forming composition, the clay can be present in the gel-forming composition in the range of about 0.25 weight % to about 30 weight %, preferably, in the range of about 0.5 weight % to about 25 weight %, and most preferably, in the range of 1 weight % to 20 weight %.

Any known weighting agent that can be suspended in said gel-forming composition can also be used in the present invention. A weighting agent is added to said gel-forming composition to increase the density. Weighting agents are utilized, for example, when said gel-forming composition is needed to block a gas release during drilling. Examples of suitable weighting agents include, but are not limited to barite, hematite, calcium carbonate, galena, or combinations of any two or more thereof. The presently preferred weighting agent is barite for it is readily available and effective. The weighting agent can be present in the gel-forming composition in the range of about 5 to about 30 pounds of weighting agent per gallon of gel-forming composition, preferably, in the range of about 8 to about 25, and most preferably, in the range of 10 to 20.

Said encapsulated crosslinking agent was previously discussed in this disclosure. The concentration of encapsulated crosslinking agent used in the present invention depends largely on the desired gelation rate. It can also depend on the concentrations of said second polymer in the gel-forming composition, on the operation conditions, or the depth of the desired location in said subterranean formation. The concentration of crosslinking agent from degraded encapsulated crosslinking agent varies generally over the broad range of about 1 mg of said crosslinking agent per liter of gel-forming composition to about 20,000 mg of said crosslinking agent per liter of gel-forming composition, preferably, in the range of about 1 mg/l to about 10,000 mg/l, and most preferably, in the range of 1 mg/l to 5,000 mg/l.

Said second polymer can be any polymer that can form a gel when employed in the presence of said crosslinking agent and said liquid. The presently preferred second polymer is a carboxylate-containing polymer due to its availability and ease of use in this invention.

The term "carboxylate-containing polymer" used herein refers to a polymer that contains at least one free carboxylic group or a carboxylate group in which the proton of the carboxylic acid is substituted with an ammonium radical, an alkali metal, an alkaline earth metal, or combinations of two or more thereof.

According to the present invention, the weight average molecular weight of said carboxylate-containing polymers can be in the range of about 10,000 to about 30,000,000, preferably in the range of about 10,000 to about 25,000,000, and most preferably, in the range of 10,000 to 20,000,000. Said second polymers having weight average molecular weights greater than about 30,000,000 can cause said gel-forming compositions to be too dense causing problems with injecting said gel-forming compositions into subterranean formations. Said second polymers having weight average molecular weights less than about 10,000 may not allow said gel-forming compositions to form strong gels. The mole percent (%) of the carboxylate group is generally in the range of from about 0.01 to about 30%, preferably, in the range of about 0.01 to about 20%, and most preferably, in the range of 0.1 to 10%. Said second polymers with greater than about 30 mole % carboxylate groups can cause said gel-forming compositions to gel too fast while second polymers with less than about 0.01% carboxylate groups can cause said gel-forming compositions to form weak gels.

Carboxylate-containing polymers suitable for use in this invention are those capable of gelling in the presence of said crosslinking agent. For example, said carboxylate-containing polymers suitable for use in this invention are selected from the group consisting of cellulose ethers, biopolysaccharides, and acrylamide-containing polymers.

Suitable cellulose ethers are disclosed in U.S. Pat. No. 3,727,688, herein incorporated by reference. Particularly preferred cellulose ethers include carboxymethylhydroxyethyl cellulose (CMHEC) and carboxymethyl cellulose (CMC) for their ready availability.

Suitable biopolysaccharides are disclosed in U.S. Pat. No. 4,068,714, herein incorporated by reference. Particularly preferred is polysaccharide B-1459 and xanthan gums which are biopolysaccharides produced by the action of *Xanthomonas campestris* bacteria. This biopolysaccharide is commercially available in various grades under the tradename of, for example, "FLOWZAN" (Drilling Specialties Company, Bartlesville, Okla. which is readily available.

Suitable acrylamide-containing polymers which also contain carboxylate groups are disclosed in U.S. Pat. No. 3,749,172, herein incorporated by reference. Particularly preferred are the partially hydrolyzed polyacrylamides possessing carboxylate groups through which crosslinking can take place. Polyacrylamides generally can become hydrolyzed under a subterranean formation condition to produce at least one crosslinkable carboxylate group and thus can also be used in the present invention. Particularly preferred acrylamide-containing polymers for use in applications in high salinity environments at elevated temperatures are thermally stable carboxylate-containing polymers of acrylamide, partially hydrolyzed polyacrylamide, such as, copolymers of N-vinyl-2-pyrrolidone and acrylamide; copolymers of sodium-2-acrylamido-2-methylpropanesulfonate, acrylamide, and N-vinyl-2-pyrrolidone; copolymers of acrylamide, sodium-2-acrylamido-2-methylpropanesulfonate, and sodium acrylate; copolymers of sodium-2-acrylamido-2-methylpropanesulfonate and acrylamide; and copolymers of sodium-2-acrylamido-2-methylpropanesulfonate, acrylamide, N-vinyl-2-pyrrolidone, and sodium acrylate. Selected carboxylate-containing copolymers also are useful in the present process, such as copolymers derived from acrylamide, which are partially hydrolyzed to acrylate, and N-vinyl-2-pyrrolidone comonomers with lesser amounts of termonomers such as vinyl acetate, vinylpyridine, styrene, methyl methacrylate, and other polymers containing acrylate groups.

Other miscellaneous polymers suitable for use as said second polymers in the present invention include, but are not limited to, partially hydrolyzed polyacrylonitriles, copolymers of acrylate and styrene sulfonate, or combinations of any two or more thereof.

Though any second polymer that is crosslinkable and gellable can be used in the present invention, the presently preferred polymers are carboxylate-containing polymers selected from the group consisting of CMHEC, CMC, xanthan gum, acrylamide-containing polymers, or combinations of any two or more thereof.

The concentration or amount of said second polymer in the gel-forming composition can range widely depending on the gelation rate needed for a particular formation condition and the type of formation. Generally, the concentration of said second polymer in said gel-forming composition is in the range of about 100 mg of said second polymer per liter of said gel-forming composition to about 100,000 mg of said second polymer per liter of said gel-forming composition, preferably, in the range of about 200 mg/l to about 70,000 mg/l, and most preferably, in the range of 200 mg/l to 50,000 mg/l. The preferred ranges produce acceptable gels at a reasonable cost.

Any suitable procedures for preparing an aqueous admixture of said second polymer can be used. Some of said second polymers can require particular mixing conditions, such as slow addition of finely powdered second polymer into a vortex of stirred brine, alcohol prewetting, protection from air (oxygen), and preparation of stock solutions from fresh rather than salt water.

Liquid generally makes up the rest of said gel-forming composition. Generally, water is used as said liquid since it is typically most economical in oil field applications. Water includes, but is not limited to, pure water, regular tap water, sea water, a solution or suspension wherein the solution or suspension contains a variety of salts, and a produced brine. Produced brine is defined as the brine co-produced with oil or gas, or both. Generally, produced brine is a hard brine, i.e., containing at least 1,000 ppm by weight of $Ca^{+2}$, $Ba^{+2}$, $Mg^{+2}$, or $Sr^{+2}$, or combinations of two or more thereof. A produced brine generally contains high salinity of from about 1% by weight to about 30% by weight total dissolved solids. A produced brine generally is contaminated with oil or gas, or both. Said second polymer generally gels well in produced brines having a salinity of from about 0.3% by weight to about 27% by weight.

The gel-forming composition of the present invention, before it is injected into a subterranean formation, can be an aqueous solution, a suspension comprising undissolved solids, gas, or oil, or combinations of two or more thereof. Upon mixing the components of the gel-forming composition, the composition can be substantially gelless, microgels, bulk gels, or combinations of any two or more thereof, which can be flowing or can travel to a desired location in a subterranean formation. However, once the gel-forming composition completes gelation, the composition becomes a nonflowable gel.

In another embodiment of this invention, a gel-forming composition is provided comprising said encapsulated crosslinking agent, said second polymer and a liquid, wherein said second polymer, said encapsulated crosslinking agent, and said liquid are each present in said gel-forming composition in an amount effective to form a gel. Said encapsulated crosslinking agent, second polymer, and said liquid have been previously described in this disclosure.

According to yet another embodiment of the present invention, a process is provided comprising injecting said gel-forming composition into a subterranean formation. Said gel-forming composition can be injected sequentially or simultaneously. In sequential injection, said encapsulated crosslinking agent in said liquid and said second polymer in said liquid are injected separately. Alternatively, in simultaneous injection, said encapsulated crosslinking agent, said second polymer, and said liquid can be mixed prior to injection.

The amount of said gel-forming composition injected can vary widely depending on the treatment required or desired. Generally, the process, i.e, the injection of said gel-forming composition, can be utilized for numerous functions. Said gel-forming composition is used in oil field operations to alter the permeability of said subterranean formation. For example, said gel-forming composition can be utilized to enhance the efficiency of water flooding or carbon dioxide injection in enhanced oil recovery processes, to plug fractures or channels, to prevent loss of drilling fluids, and to block gas release during drilling.

The nature of the subterranean formation is not critical to the practice of the process of the present invention. Said gel-forming composition can be injected into said subterranean formation having a temperature range of from about 10° C. to about 180° C. Most preferably, said subterranean formation has a temperature in the range of 10° C. to 150° C. Any means known to one skilled in the art such as, for example, pumps, can be used for injecting said gel-forming composition.

EXAMPLES

These examples are provided to further illustrate the invention.

Example 1

5 milliliters of distilled water was added to a solution of 1 gram of poly(lactic acid-co-glycolic acid) obtained as Resomer® RG506 (from Boeringer Ingelheim in Germany) and 0.836 grams of 99 wt % zirconium acetylacetonate (obtained from Strem Chemicals, Inc., MA, USA) in 20 milliliters of dichloromethane. The solution was emulsified by using an Ultra Turrax T25 mixer (obtained from Janke & Kunkel IKA Labortechnik in Germany) at 8000 revolutions per minute (rpm) for 60 seconds to produce a primary emulsion. The primary emulsion was then dispersed into a 200 milliliter aqueous solution of 0.2 wt % polyvinyl alcohol in distilled water and emulsified by using the Ultra-Turrax mixer at 8000 rpm for 30 seconds to produce a secondary emulsion. An ice-bath was used to cool said solution, primary emulsion, and secondary emulsion during the emulsification process. The polyvinyl alcohol was evaporated for 3 hours at room temperature under vigorous stirring. Encapsulated zirconium acetylacetonate particles were collected by centrifugation, washed twice with distilled water, and left overnight before they were freeze-dried. The zirconium content of the encapsulated zirconium acetylacetonate particles was 0.8 grams or 5 wt % as measured using X-ray fluorescence. A Siemens SRS 303AS wavelength dispersive spectrometer was used to make the zirconium content analyses.

Poly(acrylamide-co-acrylic acid) was dissolved in synthetic North Sea water (SNSW) to form a second solution. The poly(acrylamide-co-acrylic acid) was obtained as Alcoflood 935 from Allied Colloids Ltd, England having 10% acrylic acid and a molecular weight of 9,000,000. The SNSW had the following composition: $NaHCO_3$—0.205 g/l; $Na_2SO_4$—4.288 g/l; NaCl—23.834 g/l; $CaCl_2.2H_2O$—1.645 g/l; $MgCl_2.6H_2O$—10.774 g/l in distilled water.

Encapsulated zirconium acetylacetonate particles, produced as described earlier in this example, were added to said second solution to produce a gel-forming composition and placed in glass ampoules. The head space of the glass ampoules was evacuated with an inert gas and sealed with a torch. The gel-forming composition was shaken at ambient temperature for 30 minutes and then heated at 50° C. for 13 days and subsequently at 80° C. for 35 days while observed regularly by visual inspection.

The data are shown in Table 1. At 50° C. for 13 days, no gel formed. However, after 12 days at 80° C., a strong gel formed. These data show that an encapsulated crosslinking agent slows the gelation rate of gel-forming compositions.

Comparative Example 1

Gel-forming compositions consisting of varying concentrations of unencapsulated zirconium acetylacetone and poly (acrylamide-co-acrylic acid) obtained as Alcoflood 935 from Allied Colloids Ltd, England in SNSW were made and placed in glass ampoules. The head space of the glass ampoules was evacuated using an inert gas and then sealed by a torch. Said gel-forming compositions formed gels within less than one day at ambient temperatures.

The data are shown in Table 2. Example 1 and Comparative Example 1 illustrate that encapsulation of said crosslinking agent extends the gelation rate of gel-forming compositions. In Example 1, gels were not formed when said gel-forming compositions were heated to 50° C. for 13 days. However, in Comparative Example 1, gels formed at ambient temperatures in less than one day from gel-forming compositions with unencapsulated crosslinking agent.

Example 2

The same procedure as utilized in Example 1 was followed except 0.418 grams of zirconium acetylacetonate were added, and the ampoules were heated at 50° C. for 2 days and subsequently at 80° C. for 50 days. The zirconium content of the encapsulated zirconium acetylacetonate particles was 0.6 grams or 3 wt % as measured using X-ray fluorescence. The data are shown in Table 3.

A gel-forming composition containing 209 ppm by weight total zirconium and 0.75 wt % poly(acrylamide-co-acrylic acid) formed a gel after 10 days at 80° C. Thus, showing the delayed gelation rate caused by said encapsulated crosslinking agents.

TABLE 1

Gel-test with Alcoflood 935 and encapsulated zirconium acetylacetonate in SNSW at 50–80° C.

| Gelling Conditions | | Gelling Results | | | | | |
|---|---|---|---|---|---|---|---|
| | Second | 50° C. | 80° C. | | | | |
| Total Amount of Zirconium (ppm by wt.) | Polymer conc. (wt %) | 13 days | 4 days | 5 days | 6 days | 12 days | 35 days |
| 269 | 0.7 | NG | NG | VWG[1] | WG[1] | STG[1] | VWG[1] |
| 393 | 0.7 | NG | NG | VWG[1] | WG[1] | STG[1] | RG[1] |

NG = No gel,
VWG = Very weak gel,
WG = Weak gel,
STG = strong gel,
RG-Rigid gel.
[1]Gel without liquid.

TABLE 2

Gel-test with Alcoflood 935 and unencapsulated zirconium acetylacetonate in SNSW Gelling Conditions

| Conc. of Zr (ppm by wt.) | Second Polymer Conc. (wt %) | Gelling Results Ambient Temp. For Less Than 1 Day |
|---|---|---|
| 595 | 0.5 | weak gel |
| 228 | 1.0 | slight gel |
| 280 | 1.0 | slight gel |
| 463 | 1.0 | strong gel |
| 465 | 1.0 | weak gel |
| 701 | 1.0 | strong gel |
| 744 | 1.0 | rigid gel |

TABLE 3

Gel-test with Alcoflood 935 and encapsulated zirconium acetylacetonate in SNSW at 50–80° C.

Gelling Conditions

| Total Amount of Zirconium (ppm by wt.) | Second Polymer conc. (wt %) | Gelling Results | | | | | |
|---|---|---|---|---|---|---|---|
| | | 50° C. | | | 80° C. | | |
| | | 2 days | 2 days | 4 days | 10 days | 23 days | 50 days |
| 110 | 0.5 | NG | NG | NG | NG | NG | NG |
| 206 | 0.5 | NG | NG | NG | WG[1] | WG[1] | WG[1] |
| 231 | 0.5 | NG | NG | NG | VWG[1] | NG | NG |
| 209 | 0.75 | NG | NG | NG | RG[1] | RG[1] | VWG[1] |
| 313 | 0.75 | NG | NG | NG | WG[1] | RG[1] | RG[2] |
| 415 | 0.75 | NG | NG | NG | VWG[1] | RG[1] | RG[3] |

NG = No gel,
VWG = Very weak gel,
WG = Weak gel,
RG-Rigid gel.
[1] Gel without liquid.
[2] Gel with 15% liquid expelled.
[3] Gel with 40% liquid expelled.

That which is claimed is:

1. A process for producing an encapsulated crosslinking agent comprising the steps of:

(a) emulsifying a first aqueous solution containing the crosslinking agent with a first organic compound containing a first polymer thereby producing a primary emulsion;

(b) dispersing the primary emulsion into a second aqueous solution;

(c) emulsifying said solution of step (b) thereby producing a secondary emulsion; and (d) drying said secondary emulsion thereby producing an encapsulated crosslinking agent;

wherein said crosslinking agent is selected from the group consisting of multivalent metallic compounds and organic crosslinking agents and said first polymer is poly(lactic acid-co-glycolic acid).

2. A process according to claim 1 wherein said crosslinking agent in zirconium acetylacetonate.

3. A process for producing an encapsulated crosslinking agent comprising the steps of:

(a) emulsifying a first aqueous solution containing the crosslinking agent with a first organic compound containing a first polymer thereby producing a primary emulsion;

(b) dispersing the primary emulsion into a second aqueous solution;

(c) emulsifying said solution of step (b) thereby producing a secondary emulsion; and (d) drying said secondary emulsion thereby producing an encapsulated crosslinking agent;

wherein said crosslinking agent is selected from the group consisting of a complexed zirconium compound, a complexed titanium compound, a complexed chromium compound, a complexed aluminum compound, a complexed tin compound, a complexed iron compound and mixtures thereof and said first polymer is selected from the group consisting of homopolymers and copolymers of glycolate and lactate, polycarbonates, polyanhydrides, polyorthoesters, polyphospacenes and mixtures thereof.

4. A process to claim 3 wherein said crosslinking agent is zirconium acetylacetonate.

5. A process for producing a gel-forming composition, said process comprising mixing a zirconium compound crosslinking agent encapsulated in poly(lactic acid-co-glycolic acid), a second polymer, and a liquid.

6. A process for producing a gel-forming composition according to claim 5 wherein the concentration of said crosslinking agent from degraded encapsulated crosslinking agent ranges from about 1 mg of crosslinking agent per liter of gel-forming composition to about 20,000 mg of crosslinking agent per liter of gel-forming composition.

7. A process for producing a gel-forming composition according to claim 6 wherein said second polymer is a carboxylate-containing polymer.

8. A process for producing a gel-forming composition according to claim 7 wherein the concentration of said second polymer ranges from about 100 mg of said second polymer per liter of said gel-forming composition to about 100,000 mg of said second polymer per liter of said gel-forming composition.

9. A process for producing a gel-forming composition according to claim 8 wherein the concentration of said crosslinking agent from degraded encapsulated crosslinking agent ranges from about 1 mg of said crosslinking agent per liter of said gel-forming composition to about 10,000 mg of said crosslinking agent per liter of said gel-forming composition.

10. A process for producing a gel-forming composition according to claim 9 wherein said carboxylate-containing polymer are selected from the group consisting of cellulose ethers, biopolysaccharides, and acrylamide-containing polymers.

11. A process for producing a gel-forming composition according to claim 10 wherein the concentration of said second polymer ranges from about 200 mg of said second polymer per liter of said gel-forming composition to about 70,000 mg of said second polymer per liter of said gel-forming composition.

12. A process for producing a gel-forming composition according to claim 11 wherein the concentration of said crosslinking agent ranges from 1 mg of said crosslinking agent from degraded encapsulated crosslinking agent per liter of said gel-forming composition to 5,000 mg of said crosslinking agent per liter of said gel-forming composition.

13. A process for producing a gel-forming composition according to claim 12 wherein said carboxylate-containing polymers are selected from the group consisting of carboxymethylhydroxyethyl cellulose, carboxymethyl cellulose, xanthan gum, acrylamide-containing polymers, and combinations of any two or more thereof.

14. A process for producing a gel-forming composition according to claim 13 wherein the concentration of said second polymer ranges from 200 mg of said second polymer per liter of said gel-forming composition to 50,000 mg of said second polymer per liter of said gel-forming composition and wherein said second polymer is poly(acrylamide-co-acrylic acid).

15. A gel-forming composition comprising a zirconium compound crosslinking agent encapsulated in poly(lactic acid-co-glycolic acid), a second polymer, and a liquid wherein said second polymer, said encapsulated crosslinking agent, and said liquid are each present in said gel-forming composition in an amount effective to form a gel.

16. A gel-forming composition according to claim 15 further comprising a clay which can cause a water- or oil-based fluid to become viscous.

17. A gel-forming composition according to claim 15 further comprising a weighting agent.

18. A process comprising injecting a gel-forming composition into a subterranean formation, wherein said gel-forming composition comprises a zirconium compound crosslinking agent encapsulated in poly(lactic acid-co-glycolic acid), a gellable second polymer and a liquid.

19. A process according to claim 1 wherein said drying of step (d) comprises spray drying.

20. A process according to claim 3 wherein said crosslinking agent is selected from the group consisting of chromium chloride, chromium propionate, chromium acetate, zirconium acetylacetonate, zirconium tetrachloride, zirconium oxychloride, zirconium lactate, zirconium citrate, zirconium malonate, tetrakis(triethanolamine)zirconate, zirconium complex of hydroxyethyl glycine, zirconium tartarate, zirconium propionate, titanium acetylacetonate, titanium ethylacetoacetate, titanium citrate, titanium triethalonamine, and combinations of any two or more thereof.

21. A process according to claim 20 wherein said first polymer is copolymer of glycolate and lactate.

22. A process according to claim 21 wherein said drying of step (d) comprises spray drying.

* * * * *